Aug. 25, 1936.  W. J. TOERPE  2,051,973
EYE TESTING APPARATUS
Filed Nov. 13, 1933
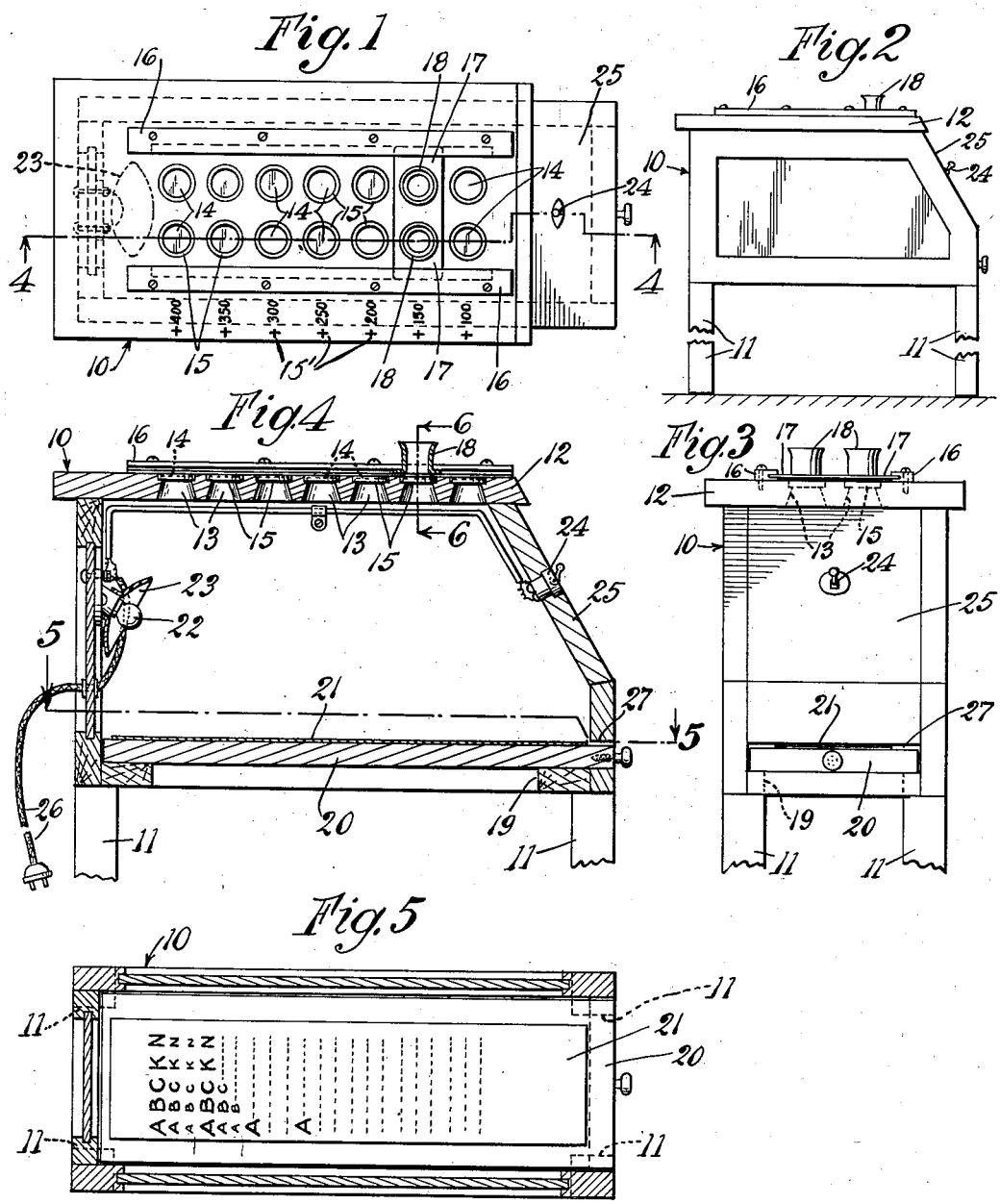
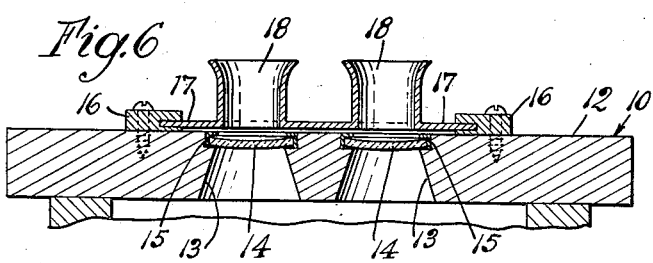
Inventor
William J. Toerpe
by Maxwell F. Cargill
Attorney.

Patented Aug. 25, 1936

2,051,973

UNITED STATES PATENT OFFICE 2,051,973

EYE TESTING APPARATUS

William J. Toerpe, Berkeley, Ill.

Application November 13, 1933, Serial No. 697,717

2 Claims. (Cl. 88—22)

This invention relates to improvements in eye testing apparatus.

One object of the invention is to provide apparatus whereby a prospective purchaser of a pair of glasses can readily determine which of a series of designated lenses afford him the degree of correction required, the series of lenses being arranged at the proper distance from an illuminated test card whereby the testing of the vision through different lenses may be effected conveniently and comparison made of the improvement in vision afforded by one lens or pair of lenses with that afforded by another lens or pair thereof, and whereby such testing will be under uniform conditions as to light and distance.

A further object of the invention is to provide apparatus comprising an illuminated cabinet or enclosure having a plurality of pairs of testing lenses mounted in a wall thereof, and a test card within the cabinet located at a fixed distance from the lenses, and having printed indicia thereon for each pair of lenses.

A further object of the invention is to provide a pair of eye tubes slidable over and adapted to register with each pair of lenses of the series for eliminating external light from the eyes during the testing thereof.

Other objects relate to various features of construction and arrangement of parts which will be apparent from a consideration of the following specification and accompanying drawing, wherein:

Figure 1 is a top plan view of an eye testing apparatus embodying my present improvements.

Figure 2 is a broken side elevation thereof.

Figure 3 is a front elevation of the apparatus.

Figure 4 is a vertical sectional view taken on line 4—4 of Figure 1.

Figure 5 is a horizontal sectional view taken on line 5—5 of Figure 4.

Figure 6 is a vertical section taken on line 6—6 of Figure 4.

In the drawing 10 indicates a cabinet which in the form shown may be provided with legs 11 for supporting the cabinet at the proper height. It will be understood, however, that the legs may be omitted and the cabinet itself placed on some suitable support such as a counter or small table.

The cabinet comprises a top wall 12 having therein a plurality of openings 13 which, as shown in Figure 4, are somewhat flaring. Positioned in the upper ends of the openings 13, which as shown in Figure 1, are arranged in pairs, are lenses 14. These lenses may, if desired, be frictionally held in position by means of rings 15, as indicated in Figure 6.

The two rows of lenses are spaced apart the average distance between the lenses of an ordinary pair of glasses, that is approximately 2⅜″ between the centers.

The various pairs of lenses, seven of which are shown for the purpose of illustration, vary in their vision correcting characteristics, which characteristics may be designated on the top of the cabinet as indicated at 15′. Any suitable system may be employed, of course, for distinguishing one pair of lenses from another; that is, they may be numbered arbitrarily, or lettered.

Extending longitudinally of the top 12 adjacent the two rows of lenses are channeled guide members 16, in the channels of which are slidably positioned flanges 17 of a pair of eye tubes 18. The tubes may be moved over the respective lenses, and will register therewith as indicated in Figure 1.

The base of the cabinet is preferably provided with an opening 19 normally closed by a slide 20 having eye testing indicia, such as letters or numerals, printed or otherwise secured thereon. In the form shown, indicia are printed on a card 21 which may be glued or tacked to the slide 20. As shown in Figure 5, the testing indicia is arranged in groups of three lines, each group being located immediately beneath one pair of lenses. The height of the cabinet is such that the indicia on the card will be at the proper distance from the lenses while the eyes are being tested.

To illuminate the card a lamp 22 is mounted on the rear wall of the cabinet, and is preferably provided with a reflector 23 for reflecting the light upon the indicia of the card to provide for the uniform illumination of the same. A switch 24 may be provided in the front inclined wall 25 of the cabinet for turning on the lamp when the apparatus is in use. The lamp is provided with a conventional plug-in cable 26 as shown in Figure 4.

In use, one who wishes to test his eyes turns on the lamp and looks through the tubes 18 at the test card 21. The tube is slidable readily from one pair of lenses to another whereby the customer, by comparison of the respective correcting characteristics of the lenses, can determine which pair of lenses is best suited for his eyes. He then notes the indicia 15′ opposite the pair of lenses selected, and purchases a pair of glasses having similar correcting characteristics.

Thus, if the purchaser found that the second pair of lenses from the right in Figure 1 gave the best results, he would purchase a pair of glasses having a plus 150 correcting characteristic, or which could otherwise be arbitrarily designated.

The slide 20 can be pulled forwardly from the cabinet through opening 27 whereby access can be had to the interior of the cabinet for renewing the lamp bulb, for cleaning the lower surface of the lenses 14, or for dusting off the card 21.

While the present arrangement is not intended to supplant the services of a skilled physician in fitting glasses, it is designed to improve the fitting of glasses such as are sold frequently in stores where no optometrist is in charge. Thus the present apparatus assures that the purchaser will select glasses which will correct his vision for the proper reading distance, which is the fixed distance between the lenses 14 and the card 21. The light within the cabinet provides uniform illumination for the test printing on the card 21.

While I have shown and described an embodiment of my improvements for the purpose of illustration, I do not wish to be restricted specifically thereto except as so limited by the appended claims.

I claim:

1. Eye testing apparatus comprising an enclosure having a stationary top wall provided with a plurality of pairs of openings therein, a pair of lenses in each pair of openings, said pairs of lenses differing in correcting characteristics, eye tubes slidable over said lenses for registration with each pair thereof, guiding means on said wall to which said tubes are slidably secured, a plurality of groups of similar test indicia in said enclosure, each group being arranged at a fixed distance from and directly beneath one pair of said lenses, and a source of light in said enclosure for illuminating said indicia.

2. Eye testing apparatus comprising a cabinet having top, bottom and side walls forming a complete enclosure, the top wall of said cabinet having openings therein arranged in pairs, lenses in each pair of openings, each pair of lenses having different vision correcting characteristics, said bottom wall of said cabinet being removably secured thereto to provide access to the interior of said cabinet, indicia on said bottom wall arranged in a plurality of groups, one group being disposed immediately beneath each pair of lenses, a lamp in said cabinet for directing light upon said indicia, and an eye-tube slidably carried by said top wall for selective movement into registration with each pair of lenses.

WILLIAM J. TOERPE.